March 3, 1942.                T. U. SISSON                2,274,811
                          AMUSEMENT APPARATUS
                         Filed Dec. 14, 1939         5 Sheets-Sheet 1
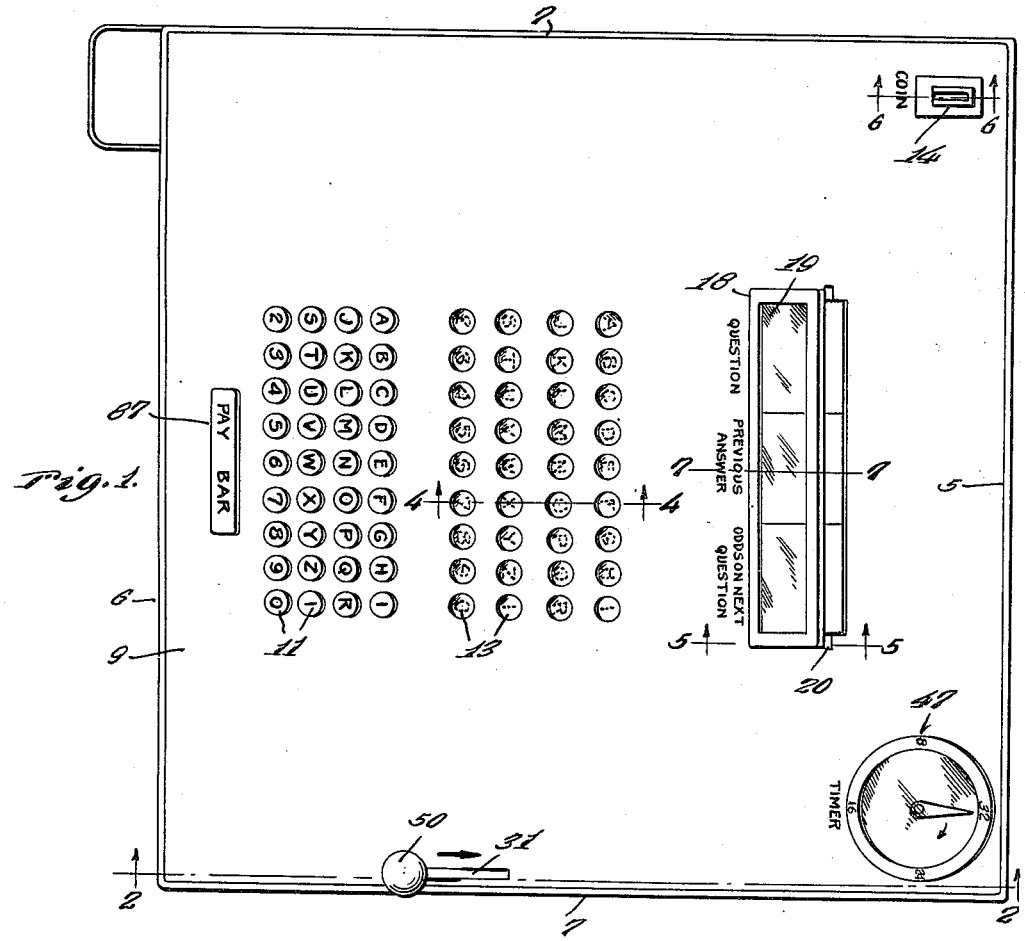
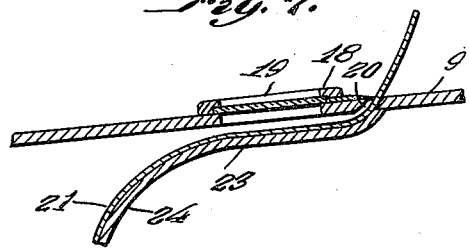
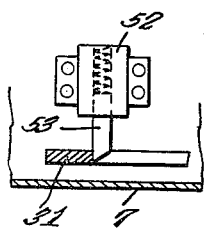
Inventor
T. U. Sisson
By Clarence A. O'Brien
and Hyman Berman
Attorneys March 3, 1942. T. U. SISSON 2,274,811
AMUSEMENT APPARATUS
Filed Dec. 14, 1939  5 Sheets-Sheet 2
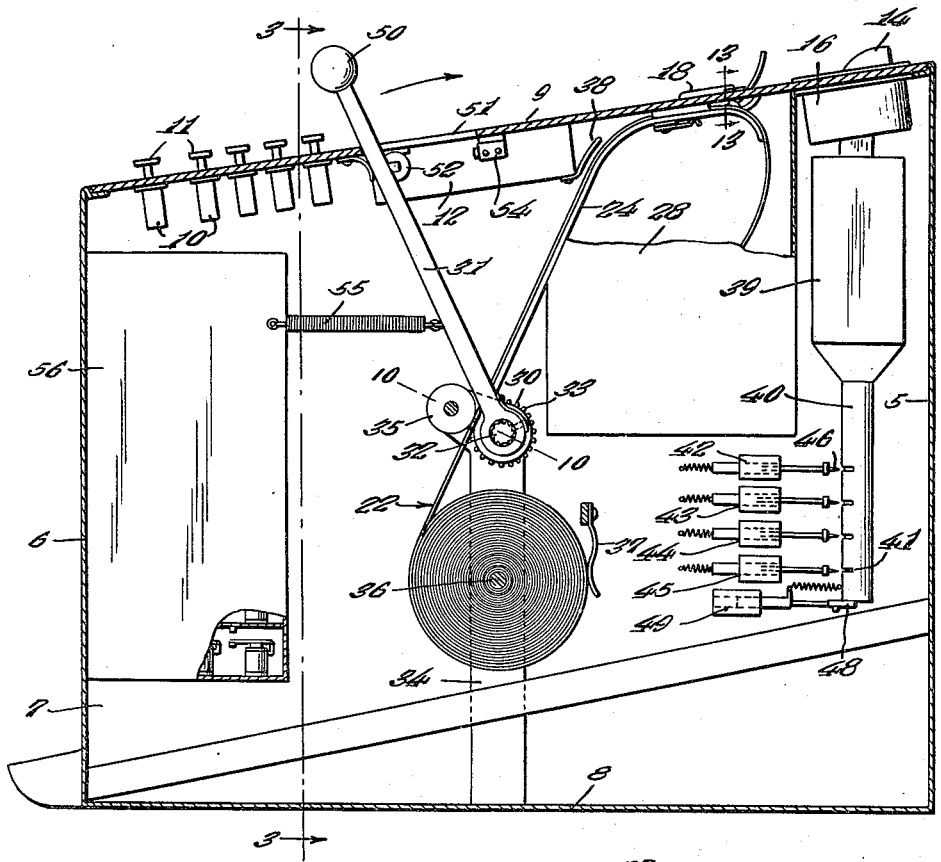
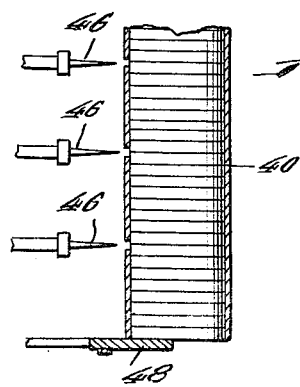
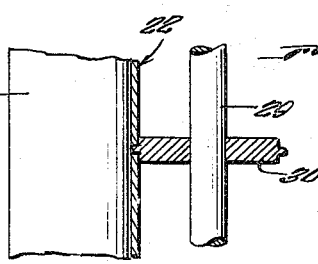
Inventor
T. U. Sisson
By Clarence A. O'Brien
and Hyman Berman
Attorneys March 3, 1942.  T. U. SISSON  2,274,811
AMUSEMENT APPARATUS
Filed Dec. 14, 1939  5 Sheets-Sheet 3

Inventor
T. U. Sisson

By Clarence A. O'Brien
and Hyman Berman
Attorneys

March 3, 1942.     T. U. SISSON     2,274,811
AMUSEMENT APPARATUS
Filed Dec. 14, 1939     5 Sheets-Sheet 4
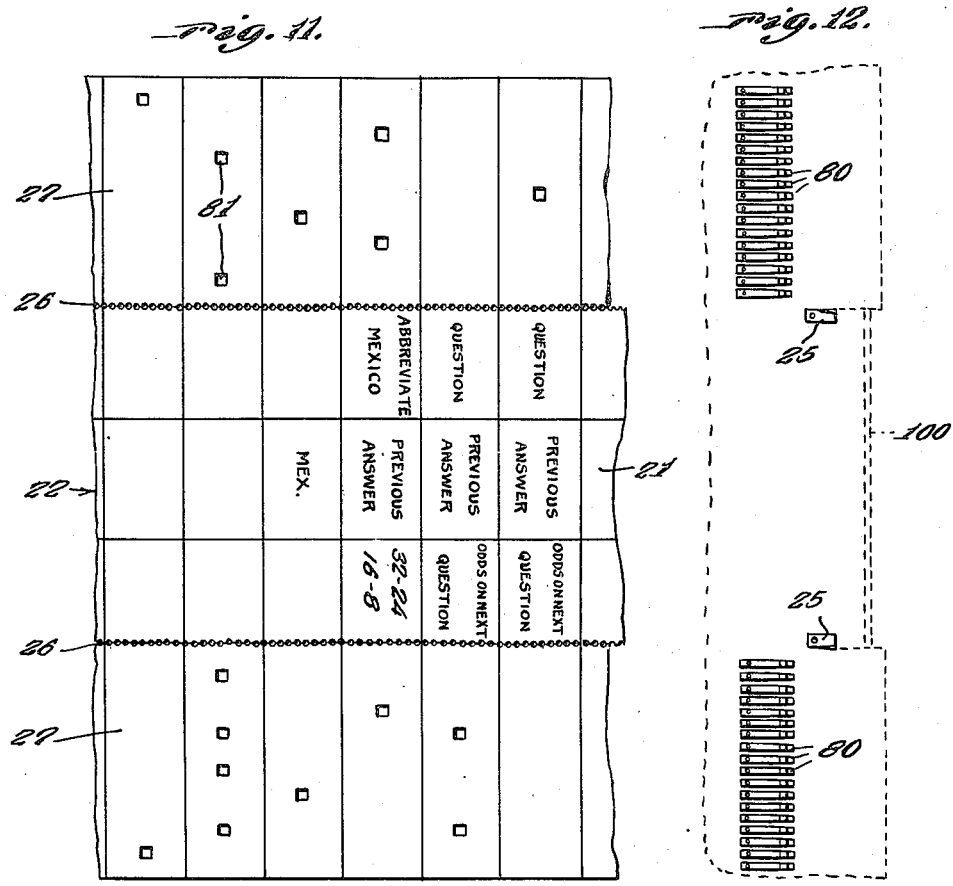
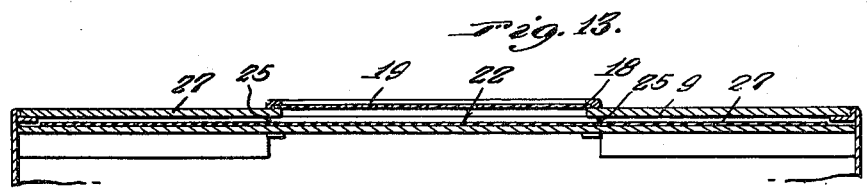
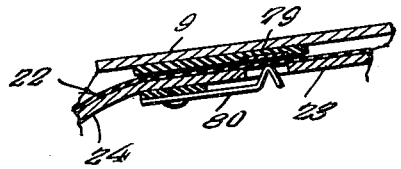
Inventor
T. U. Sisson
By Clarence A. O'Brien
and Hyman Berman
Attorneys

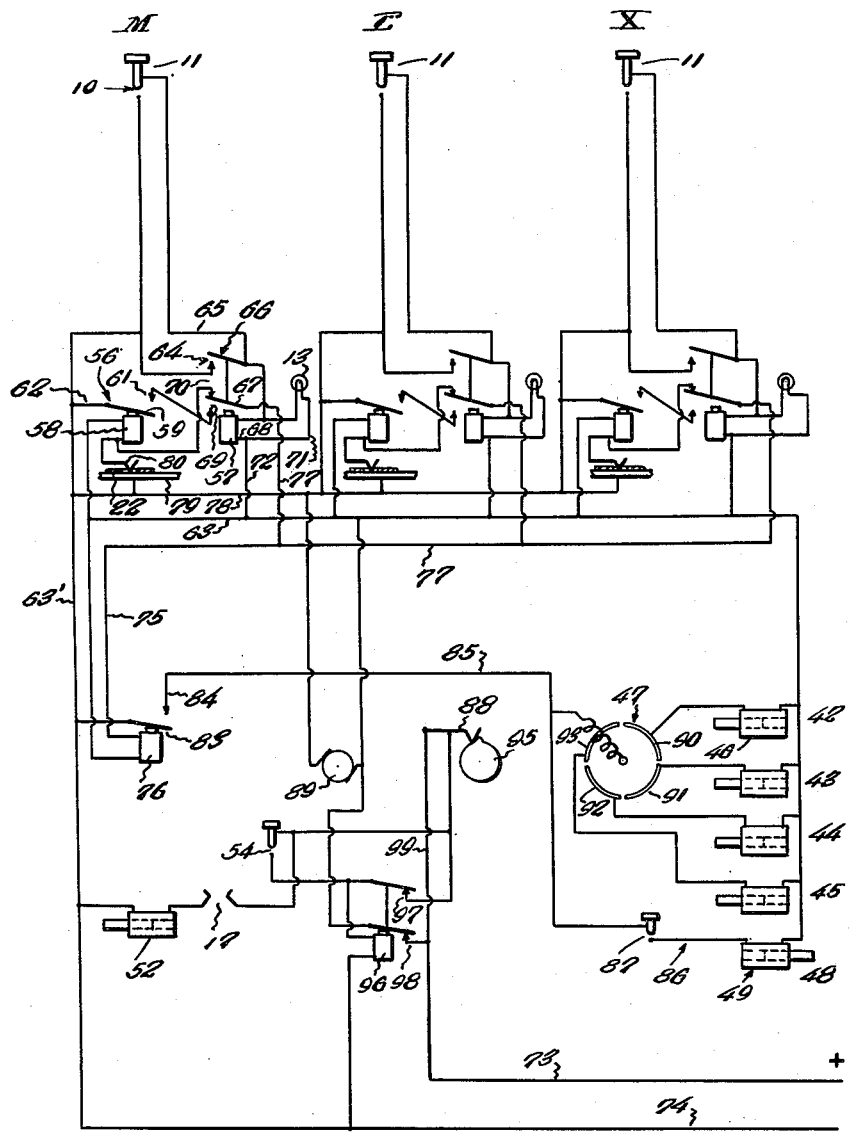

Patented Mar. 3, 1942

2,274,811

UNITED STATES PATENT OFFICE 2,274,811

AMUSEMENT APPARATUS

Thomas Upton Sisson, Gulfport, Miss.

Application December 14, 1939, Serial No. 309,294

3 Claims. (Cl. 35—48)

This invention relates to new and useful improvements in the art of amusement apparatus and more particularly to an apparatus of the check or coin controlled type.

The principal object of the present invention is to provide an apparatus which will satisfy the public demand for question and answer programs, by affording an apparatus which is stocked with questions and in which selector means is involved whereby the selector can choose the answer decided upon.

Other objects and advantages of the invention will become apparent to the reader of the following specification.

In the drawings:

Figure 1 represents a top plan view of the apparatus.

Figure 2 is a section on the line 2—2 of Figure 1.

Figure 3 is a transverse sectional view taken substantially on the line 3—3 of Figure 2.

Figure 4 is a fragmentary enlarged detailed sectional view taken substantially on the line 4—4 of Figure 1.

Figure 5 is an enlarged fragmentary detailed sectional view taken substantially on the line 5—5 of Figure 1.

Figure 6 is an enlarged fragmentary detailed sectional view taken substantially on the line 6—6 of Figure 1.

Figure 7 is an enlarged fragmentary detailed sectional view taken substantially on the line 7—7 of Figure 1.

Figure 8 is a fragmentary substantially horizontal view through the control lever showing the lock therefor.

Figure 9 is a fragmentary vertical sectional view through the pay off stack and dividers.

Figure 10 is a fragmentary detailed sectional view taken substantially on the line 10—10 of Figure 2.

Figure 11 is a fragmentary plan view disclosing the web.

Figure 12 is a top plan view of the web riding contact fingers.

Figure 13 is a sectional view taken substantially on the line 13—13 of Figure 2.

Figure 14 is a sectional view through the spring contact arrangement and web.

Figure 15 is a diagrammatic view disclosing the electrical connection between the electrical devices involved.

Referring to the drawings wherein like numerals designate like parts, it can be seen that the apparatus consists of the back wall 5, front wall 6, side walls 7, bottom wall 8 and inclined top wall 9. As clearly shown in Figure 2 a bank of switches 10 is secured to the underside of the lower portion of the top 9 and through the top 9 project the stems of the push buttons 11 which operate the switches 10.

In a box 12 under the top 9 are the lamps 13, one for each of the buttons 11. At the upper left hand corner of the top 9 is the coin chute mouth 14 registering with an opening 15 through the top 9, which, in turn, registers with the upper end of the coin chute 16 in which a pair of contacts 17 are located and adapted to be bridged by a coin as it drops through the chute 16.

The top 9 further has an elongated window consisting of the frame 18 and window pane or panes 19. The top 9 is formed with an elongated slot 20 just above the frame 18 and through this the center strip 21 of the web generally referred to by numeral 22 can travel, the strip 21 being guided by the apron 23 which extends from the slot 20 in a forwardly direction and curve downwardly as at 24. Cutters 25 are secured by suitable means to the apron 23 to the end that the web 22 can be divided along the lines of perforations 26—26, thus permitting the perforated strips 27—27 to be divided from the intermediate strip 21, to the end that the intermediate strip 21 can pass outwardly through the slot 20 while the side or marginal strips 27 pass downwardly into the container 28.

As shown in Figure 2, the apron has the portion 24 disposed inclinedly down to the shaft 29 which has a pair of sprocket wheels 30 thereon for meshed action with the perforations 26. At one end of this shaft 29 is the hand lever 31 which has a ratchet 32 and pawl 33 connected with the said shaft 29 so that upon movement of the hand lever 31 in the direction of the arrow as shown in Figure 2, the web 22 will be fed upwardly.

Post members 34 resting upon the bottom 8 serve to support the shaft 29 and also the roll 35 which bears against the web 22 in opposed relation to the wheels 30. The posts 34 also serve to support the shaft 36 on which is the roll of the web 22 and a spring or springs 37 serve to hold the roll against slackness.

As can be seen in Figure 2, guide fingers 38 are provided on the lamp box 12 to guide the web on to the guide apron 23.

As shown in Figure 2, numeral 39 represents the hopper for coins or checks from which extends the stack 40 having slots 41 at equal spaced intervals from the lower end thereof upwardly.

The magnets 42, 43, 44 and 45 control gates 46 and these are controlled by the time mechanism generally referred to by numeral 47 (see Figure 15). The slidable bottom 48 for the stack 40 is controlled by the electro-magnet 49.

The handle 31 has the knob 50 at its upper end and this handle operates through the slot 51 in the top 9. An electro-magnet 52 having the beveled armature member 53 normally holds the hand lever 31 against operation. However, when this magnet 52 is energized by the bridging of the contact 17 when a coin is inserted into the chute 16 (see Figure 6) the handle 31 is released and the same can be forced forwardly to engage the switch 54 and close the same. A coiled tension spring 55 is interposed between the handle 31 and the relay box 56 to normally return the hand lever 31 to the position shown in Figure 2, behind the latch armature 53.

As can be seen in Figure 15, each of the push button switches 10 has a pair of relays generally referred to by numerals 56 and 57 associated therewith. The relay 56 consists of the electro-magnet 58 energizable to operate the armature 59 breaking contact 61. When the electro-magnet 58 is deenergized, the armature 59 engages the contact 61. One side of the coil 58 is connected by the jumper 62 to the negative line 63 and also to the armature 59. This negative line 63 is connected to one side of the push button switch 10 and also to the contact 64 of the relay 57. The other side of the switch 10 is connected by the jumper 65 to the switch arm 66 which is non-electrically connected to the switch arm 67, controllable by the coil 68 of the relay 57 to engage the contact 69 when the coil 68 is energized or the contact 70 when the coil 68 is deenergized. As shown in Figure 16, the contact 70 is connected to the contact 80, while the contact 69 is connected to the contact 61. The coil 68 is connected in the circuit 71 with the corresponding lamp 13 and this circuit 71 has a parallel connection 72 with the positive side 73 of the current supply line 74 through contacts 97 and 98 of relay 96. The current supply line 75 from the master relay generally referred to by numeral 76 is connected to the lower switch arm 67 of the relay 57 by the jumper 77.

It will now be observed that the web 22 is predeterminedly perforated. In other words, the spring contact fingers 80 riding the web 22 must find the proper perforations 81 and the keys corresponding to these perforations pressed before the master relay 76 will be deenergized, to the end that its armature 83 will engage the contact 84 and permit the current to be supplied from the line 74 along the conductor 85 to the bottom gate 48 of the pay off stack 40, this gate magnet 49 being in the circuit 86 with the pay off switch 87, time controlled mechanism cut-off switch 88, motor 89 and time mechanism 47, it being observed that the time mechanism 47 is connected in parallel with the circuit 86. The time mechanism 47 includes the time segment 90, segment 91, segment 92, and segment 93, the first segment 90 extends to the solenoid 42, the segment 91 to the solenoid 43, the segment 92 to the solenoid 44, and the segment 93 to the solenoid 45. The motor 89 drives this group of segments and it is preferable that sixty seconds be allowed for the player within which to answer the question. If he answers the question while the contactor 94 is on the first segment 90 and pushes the pay off switch 87, the pay off will be the highest and that is, all of the coins or checks below the uppermost divider 46, the divider controlled by the solenoid 42 will drop.

When the contactor 94 has made the entire revolution, the cam 95 will operate the switch 88 to break the circuit so that the timing mechanism will be disrupted. The momentum of the motor 89, however, will be sufficient to carry the cam 95 barely under the switch 88 so that the mechanism will be set for the next operation.

When the hand lever 31 is pushed forwardly after the same has been released by the depositing of a coin, the hand lever engages the switch 54 so as to close the same and permit the current to pass into the relay 96 to the end that the armature 97 is attracted against the contact 98 and the connection 99 is established by the relay. Manifestly, the correct buttons 11 will have to be pushed in order for the master relay 76 to be deenergized and current supplied to the pay off magnet 49.

Assume that the question in the question column of the web 22 is "What is the abbreviation for Mexico?". The abbreviation being "Mex.", the player would have to push the corresponding lettered buttons. As the correct button 11 is pushed, the corresponding relay coil 68 will be energized, pulling its armature 67 downwardly to engage the contact 69, and as the magnet 58 is holding its armature 69 away from the contact 61, the contact 61 forms a dead-end for the supply line 75 from the master relay 76. So long as anyone of the spring contacts 80 is engaging the contact plate 79 through a perforation in the web 22 and the proper key 11 has not been pushed, the relay 76 will remain closed and there can be no pay off by reason of the spaced relation of the armature 83 to the contact 84.

As shown in Figure 5, a knife edge 100 is provided at the lower edge of the slot 20 so that the intermediate strip 21 can be torn off when desired.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An amusement apparatus comprising a housing having a slot in one wall thereof, a web having questions thereon, a roll upon which the web is payable, manual means for feeding the web, said web having a border, said border having selector openings therein, questions answering selector switches, a current supply plate against which one side of the border rides, contact fingers against which the other side of the border rides and through the openings in which registering contact fingers can protrude to engage the current supply plate, magnetic latch means for the manual means, a source of current, a check controlled switch for connecting the source of current with the magnetic latch means and with the current supply plate, reward establishing means for correct answering of the questions by the selector switch, said fingers and selector switches being connected in multiple with the reward establishing means, and a window in the housing in advance of the slot and through which the questions on the web are visible.

2. An amusement apparatus comprising a housing having a slot in one wall thereof, a web having questions thereon, a roll upon which the web is payable, manual means for feeding the web, said web having a border, said border being defined from the web by a line of perforations, said border having selector openings therein, question answering selector switches, a current supply plate against which one side of the border rides, contact fingers against which the other side of the border rides and through the openings in which registering contact fingers can protrude to engage the current supply plate, magnetic latch means for the manual means, a source of current, a check controlled switch for connecting the source of current with the magnetic latch and with the supply plate, and a window in the housing in advance of the slot and through which questions on the web are visible.

3. An amusement apparatus comprising a housing having a slot in one wall thereof, a web, a roll upon which the web is payable, manual means for feeding the web, said web having a border, said border being defined from the web by a line of perforations, said border having selector openings therein, selector switches, a current supply plate against which one side of the border rides, contact fingers against which the other side of the border rides and through the openings in which registering contact fingers can protrude to engage the current supply plate, magnetic latch means for the manual means, a source of current, a check controlled switch for connecting the source of current with the magnetic latch and with the supply plate, reward establishing means, said fingers and selector switches being connected in multiple with the reward establishing means, and a window in the housing in advance of the slot and through which indicia on the web is visible, said slot being sufficiently long to barely take the width of the web, said border being adapted to rip from the web as the web is dispensed through the slot, to collect in the housing.

THOMAS UPTON SISSON.